Patented Dec. 19, 1950

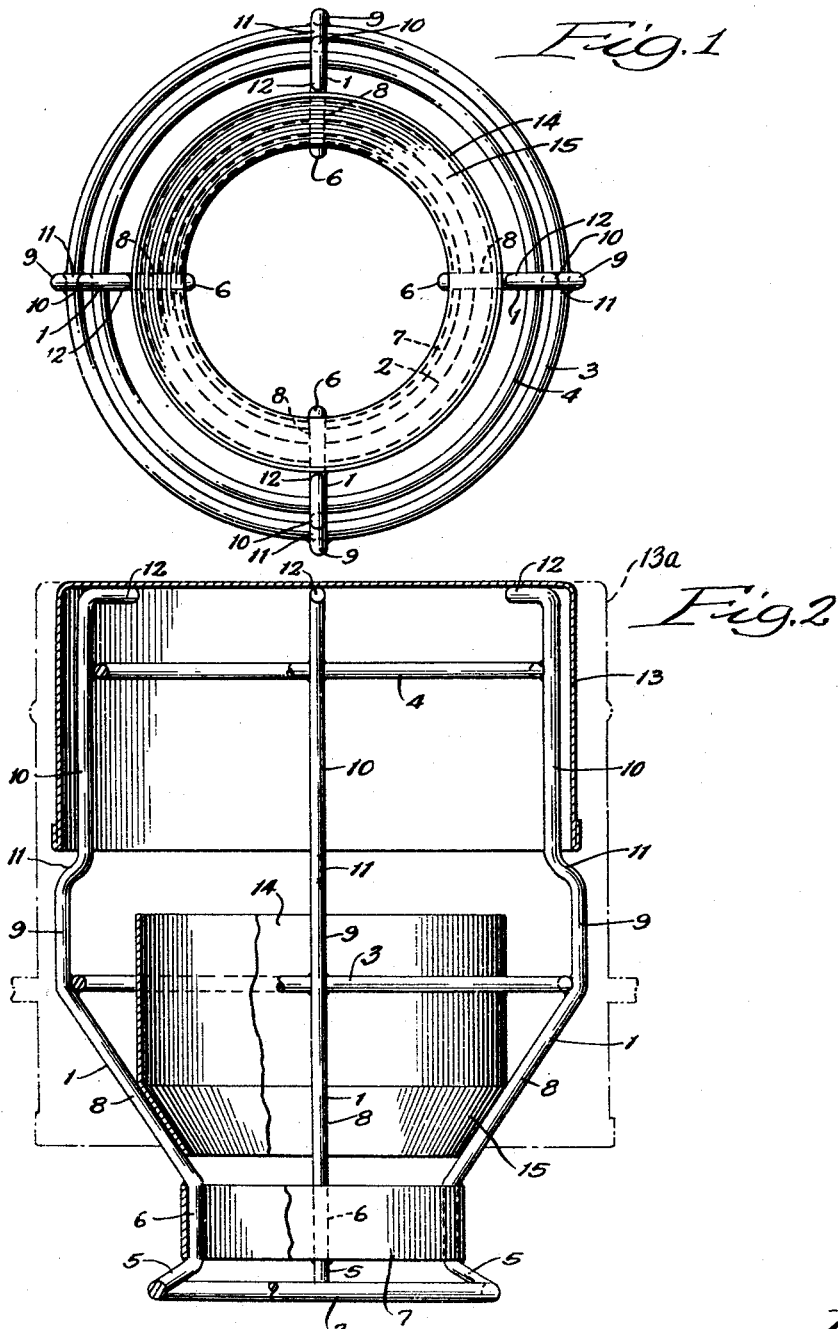

2,534,345

UNITED STATES PATENT OFFICE 2,534,345

CHEESE HOOP HOLDER FOR MILK CAN WASHING MACHINES

Arthur Farrar, Huntington, Ind., assignor to Kraft Foods Company, a corporation of Delaware Application November 18, 1944, Serial No. 564,038

7 Claims. (Cl. 134—49)

This invention relates to a holder whereby cheese hoops of various sizes may be washed by being passed through a washing machine which is designed for washing and sterilizing conventional milk or cream cans, such as the popular 10-gallon size can. Such washing machines are equipped with mechanism for propelling the milk cans in inverted position through an elongated chamber, and for spraying the cans, particularly the interior thereof with various washing sprays which may include hot water, cold water and various cleansing and sterilizing solutions, after which the cans are dried by blasts of hot air delivered thereinto. Such can washing machines are provided with means for propelling the can step by step through the chamber, the propelling means being such that the mouth end of the milk can is securely gripped to thereby hold the can in place during the various washing steps. Devices for controlling the various washing sprays are provided, such controlling devices being actuated by trip levers or other elements which are designed to engage the short cylindrical neck of the said conventional form of milk can.

It is the main object of the present invention to provide an adapter or holder whereby cheese hoops of different sizes, each of which differ greatly in size and in shape from the standard milk can, may also be passed through a milk can washing machine and automatically subjected to the same washing sprays and operations notwithstanding the different sizes and shapes of the cheese hoops relative to the size and shape of a milk can. It is also an object of the invention to provide an adapter for the purpose indicated, which will be of simple and durable construction and which will not interfere with the effective washing of the cheese hoop.

Other objects and advantages of the invention will be understood by reference to the following specification and accompanying drawing (one sheet) wherein there is illustrated an adapter or holder embodying a selected form of the invention.

In the drawing:

Fig. 1 is a top plan view; and

Fig. 2 is a side elevation.

The adapter shown in the drawing is in the form of a skeleton frame which simulates at least the portion of a conventional milk can which cooperates with the trip levers or other elements which control the washing operations. Said skeleton frame comprises a series of generally vertical or upright rods 1 (there being four such rods in this instance), the said rods being tied or united in relatively fixed position by a lower annular end member 2, an intermediate annular member 3, and an upper annular member 4. The uprights 1 and the annular members or tie means 2, 3 and 4 are each formed of round rods, and these parts are rigidly united by being welded together where they contact one another.

The lower end or mouth member 2 is of an external diameter which corresponds to the diameter of the mouth end of a standard 10-gallon milk can. The upright rods 1 each have short angularly inwardly extending, converging lower end portions 5 and neck portions 6, which extend vertically upwardly from the inner ends of the portions 5. The neck portions 6 are so spaced from each other as to snugly receive a continuous annular, cylindrical neck band or collar 7 of sheet-metal, the outer diameter of which corresponds to the outer diameter of the corresponding neck portion of a standard milk can.

The rods 1 also have angular or upwardly and outwardly inclined diverging lower portions 8 which extend upwardly and outwardly from the upper ends of rod neck portions 6, and intermediate portions 9 which extend vertically upwardly from the upper ends of said lower portions 8. The rods 1 also have upper portions 10 which are offset inwardly from the intermediate portions 9 by means of inwardly extending offsets 11. The extreme upper ends of the rods are bent horizontally inwardly to provide rests 12.

The described holder or adapter comprises a skeleton frame which is adapted to be placed in the standard milk can washing machine and gripped by the usual can feeding means which acts on the mouth end member 2. Said member 2 is preferably made somewhat heavier than the other parts of the adapter so as to be adapted to withstand the pressure applied thereto by the gripping mechanism which embraces and squeezes the member tightly between oppositely disposed gripping dogs.

In the cheese-making industry several sizes of hoops are employed, one large size being known as a "Cheddar" hoop and being about 15 inches in diameter and 15 inches deep; another size being known as a "Twin," being about 15 inches in diameter and about 7 inches deep; and a third size being known as a "Daisy" which is approximately 13½ inches in diameter and about 5 inches deep.

The said smaller sized or "Daisy" hoop is shown at 13, the hoop being placed in inverted position on the upper end of the adapter. The "Twin" hoop will occupy a similar position except that its side wall being somewhat deeper may extend downwardly to embrace the intermediate portions 9 of the holder, and the larger or "Cheddar" hoop will occupy a similar position except that its side wall, being deeper, will extend downwardly over the intermediate portions 9 and the portions 8 as shown in broken lines 13a in Fig. 2.

Various cleansing sprays are directed through the center of the adapter to act on the interior of the hoop carried by the adapter. When washing the shallow "Daisy" hoop some means is desirable to more effectively carry the sprays upwardly or to confine the spread of the sprays so that the maximum amount thereof reaches the interior of the hoop. For this purpose there is provided a shield 14, the upper portion of which is substantially cylindrical and the lower portion 15 of which is of tapered or conical form adapted to rest on the angular portions 8 of the uprights. This shield 14 may be readily seated in the holder and it may be readily removed when its use is not desired. It requires no fastening to the holder but merely rests on the angular portions 8 thereof. The shield is usually removed when washing "Twin" and "Cheddar" hoops.

The tie means or annular members 3 and 4 are preferably located within the rods 1 so that they will not interfere with the flow of the washing solutions in contact with the walls of a hoop placed on the adapter. It will be observed that the uprights 1 are disposed in the general direction of travel of the washing fluids and that they will therefore not prevent the fluids from reaching all portions of the interior of the hoop. The hoops fit rather loosely around the adapter. For example, the large "Cheddar" hoops, being approximately 15 inches in diameter, would have approximately ½ inch in clearance around the largest diameter, intermediate portions 9 of the adapter, the diametrical spread of which should be approximately 14 inches outside. Similar clearance is provided for the smaller "Daisy" hoops by the reduced outside dimension of the upper portion of the adapter.

During the passage of the adapter with a cheese hoop thereon through a milk can washing machine of the character already referred to, the neck portion of the adapter, comprising the rod neck portions 6 and the band 7, provides a continuous surface for engaging various trips or actuating members which control the various operations of the washing machine. The continuous neck band or collar 7 eliminates any need for careful positioning of the holder with relation to such actuating devices.

In one practical embodiment of the device some of the principal dimensions are as follows: The outside diameter of the mouth or end member 2 is 9⅜ inches. The outside diameter of the neck 7 is 7½ inches. The outside diameter of the intermediate portions 9 is 14 inches. The outside diameter of the upper portions 10 is 12½ inches.

The vertical width of the neck 7 is 2 inches, and the lower edge thereof is spaced upwardly 1 inch from the bottom plane of the end member 2. The bend joining the angular portions 8 and the intermediate portions 9 of the rods occurs at a point 8 inches from the lower end of the holder, and the total height of the holder is 18½ inches.

The cylindrical upper portion of the shield 14 is 9½ inches in outside diameter and 4½ inches high, the tapered portion thereof being 1¾ inches in height and tapered to correspond to the angle of the portions 8 of the rods 1. These dimensions and other details of construction may, of course, be varied to suit any given requirements.

I claim:

1. An adapter for washing cheese hoops in a milk can washing machine wherein a milk can is propelled through the machine by means engaging its mouth portion, and wherein the washing operation is controlled by a device which is engaged by the neck portion of the milk can as an incident to the travel of the milk can through the machine, the adapter comprising a skeleton frame provided with an upper portion of such external size as to fit within an inverted cheese hoop, and with lower end and neck portions having dimensions which are substantially equal to the dimensions of the mouth and neck portions, respectively, of a milk can, whereby said lower end and neck portions of said frame are the functional equivalents of the mouth and neck portions, respectively, of a milk can in respect to the can propelling means and the washing control device of the milk can washing machine.

2. A holder for washing cheese hoops in a milk can washing machine, comprising a skeleton frame having a lower end member and a neck of a size and shape which are substantially equivalent to the size and shape of the mouth and neck respectively of a conventional milk can, said frame embodying a plurality of rods extending upwardly from said neck in circumferentially spaced relation to each other, and tie means uniting upper portions of said rods so as to maintain said upper rod portions in fixed relation to each other.

3. A holder for washing cheese hoops in a milk can washing machine, comprising a skeleton frame having a lower end member and a neck of a size and shape which are substantially equivalent to the size and shape of the mouth and neck respectively of a conventional milk can, said frame embodying a plurality of rods extending upwardly from said neck in circumferentially spaced relation to each other, said rods having lower portions extending angularly outwardly and upwardly from said neck and portions extending vertically upwardly from the upper ends of said angularly extending portions, and tie means inwardly of said rods and secured thereto in upwardly spaced relation to said neck for holding said rods in fixed relation to each other.

4. A holder for washing cheese hoops in a milk can washing machine, comprising a skeleton frame having a lower end member and a neck of a size and shape which are substantially equivalent to the size and shape of the mouth and neck respectively of a conventional milk can, said frame embodying a plurality of rods extending upwardly from said neck in circumferentially spaced relation to each other, said rods having lower portions extending angularly outwardly and upwardly from said neck, intermediate portions extending vertically upwardly from the upper ends of said angularly extending portions, upper portions offset inwardly from said intermediate portions, and short upper end portions extending horizontally inwardly from the upper ends of said upper portions to form cheese hoop supports, and tie means inwardly of said rods and secured thereto in upwardly spaced relation to said neck for holding said rods in fixed relation to each other.

5. A holder for washing cheese hoops in a milk can washing machine, comprising a skeleton frame having a lower end member and a neck of a size and shape approximately that of the mouth and neck respectively of a conventional milk can, said frame embodying a plurality of rods extending upwardly from said neck in circumferentially spaced relation to each other, said rods having lower portions extending angularly outwardly and upwardly from said neck, and upper portions extending vertically upwardly from the upper ends of said angularly extending portions, and a tubular shield removably mounted in the frame adjacent its lower end for guiding washing fluids upwardly within the frame.

6. A holder for washing cheese hoops in a milk can washing machine, comprising a skeleton frame having a lower end member and a neck of a size and shape which are substantially equivalent to the size and shape of the mouth and neck respectively of a conventional milk can, said frame embodying a plurality of rods in circumferentially spaced relation to each other, said rods having neck portions, lower portions extending angularly outwardly and upwardly from said neck portions, intermediate portions extending vertically upwardly from the upper ends of said angularly extending portions, upper portions offset inwardly from said intermediate portions, and upper end portions extending horizontally inwardly from the upper ends of said upper portions to form cheese hoop supports, and a continuous cylindrical neck band mounted on the outside of the neck portions of said rods, said rod neck portions and said neck band constituting said neck of said skeleton frame.

7. A holder for washing cheese hoops in a milk can washing machine, comprising a skeleton frame having an annular lower end member and a neck of a size and shape approximating that of the mouth and neck respectively of a conventional milk can, said frame embodying a plurality of vertically disposed, circumferentially spaced rods, said rods having converging lower end portions extending angularly upwardly and inwardly from said end member, portions extending upwardly from the upper ends of said inwardly and upwardly extending portions and forming a part of said neck, diverging portions extending outwardly and upwardly from the upper ends of said neck forming portions, intermediate portions extending vertically upwardly from the upper ends of said diverging portions, upper portions offset inwardly from said intermediate portions, and short upper end portions extending horizontally inwardly from the upper ends of said upper portions to form cheese hoop supports, and a tubular shield for guiding washing fluids upwardly within the frame, said shield having a frusto-conical portion removably seated on said diverging rod portions and terminating, at its upper end, intermediate the ends of said diverging rod portions, and a cylindrical portion extending upwardly from the upper end of said frusto-conical portion.

ARTHUR FARRAR.

REFERENCES CITED

The following references are of record in the file of this patent:

UNITED STATES PATENTS

| Number | Name | Date |
|---|---|---|
| 687,655 | Scheid | Nov. 26, 1901 |
| 910,882 | Truesdell | Jan. 26, 1909 |
| 1,172,702 | Gotthardt | Feb. 22, 1916 |
| 1,341,869 | Watson | June 1, 1920 |
| 1,395,506 | Mansure | Nov. 1, 1921 |
| 1,475,535 | Bonine et al. | Nov. 27, 1923 |
| 1,539,031 | Thompson | May 26, 1925 |
| 1,642,824 | Paulson | Sept. 20, 1927 |
| 2,043,032 | Brasfield | June 2, 1936 |
| 2,051,091 | Ladewig et al. | Aug. 18, 1936 |

FOREIGN PATENTS

| Number | Country | Date |
|---|---|---|
| 159,821 | Great Britain | July 26, 1920 |